United States Patent Office 3,249,139
Patented May 3, 1966

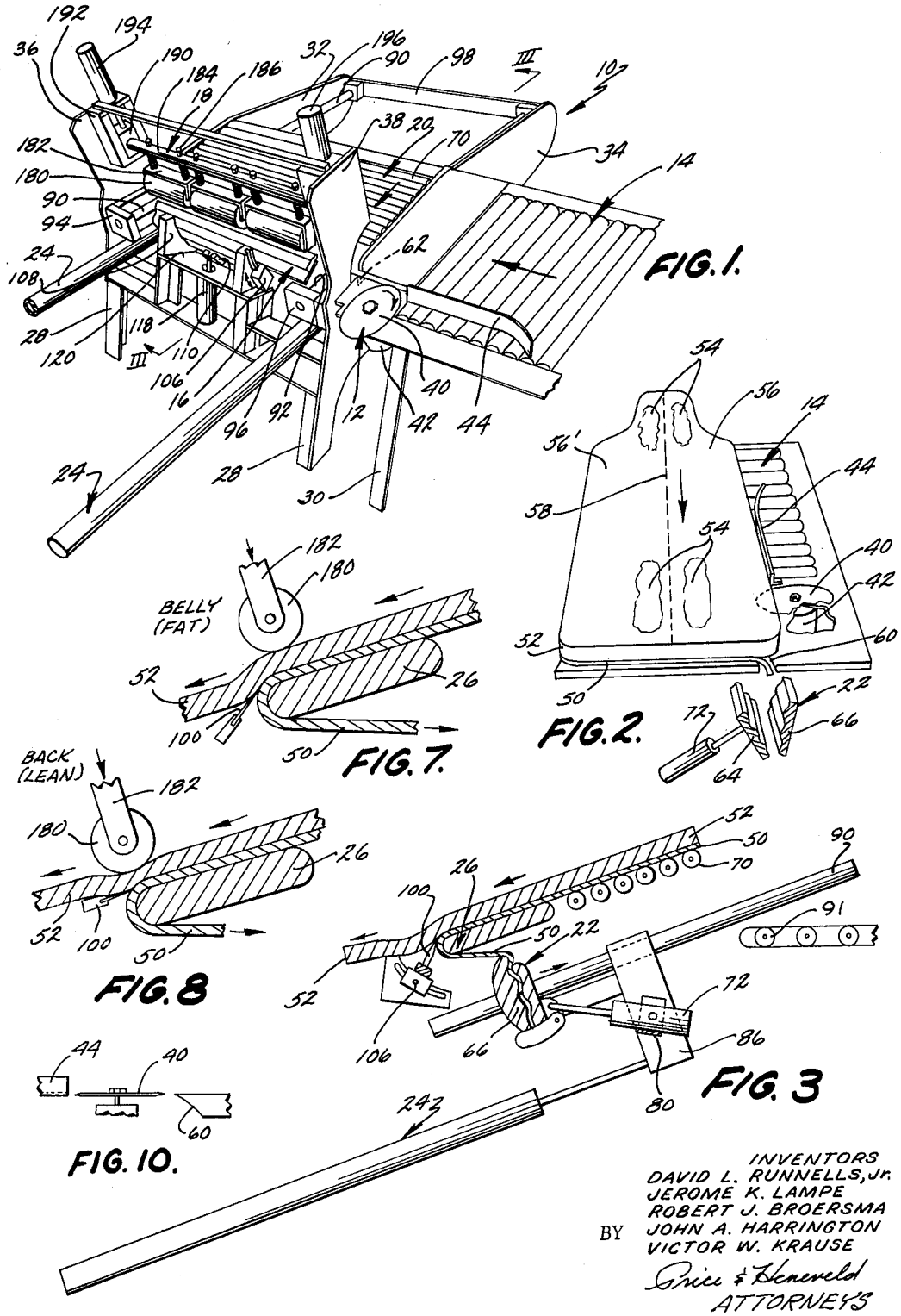

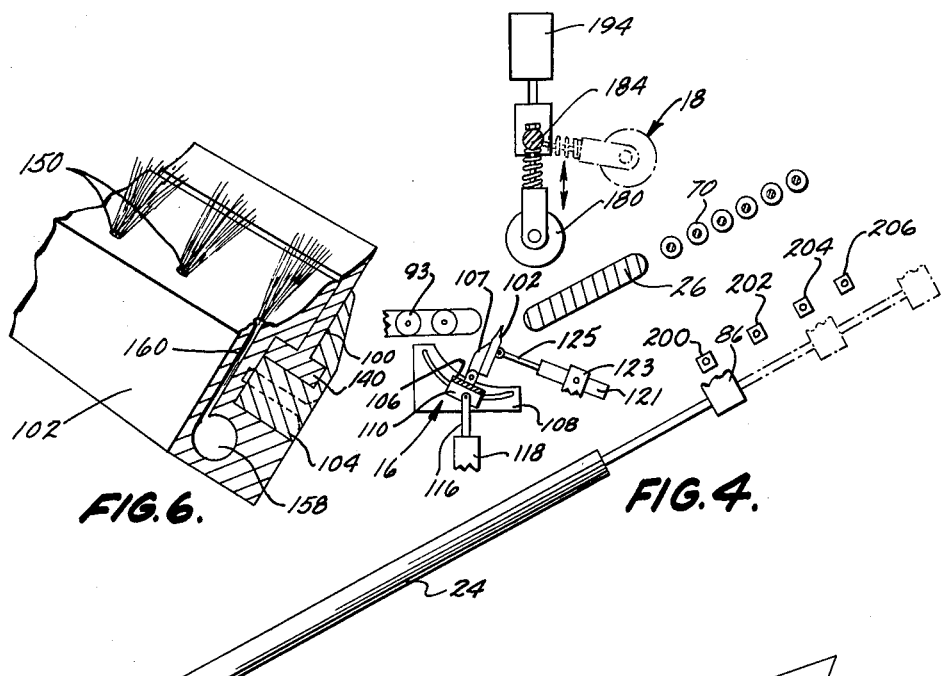
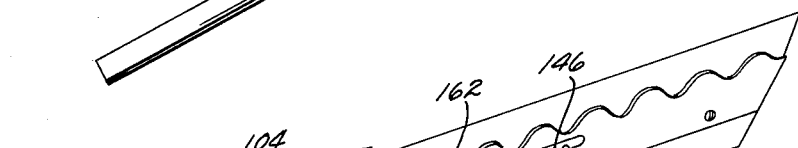
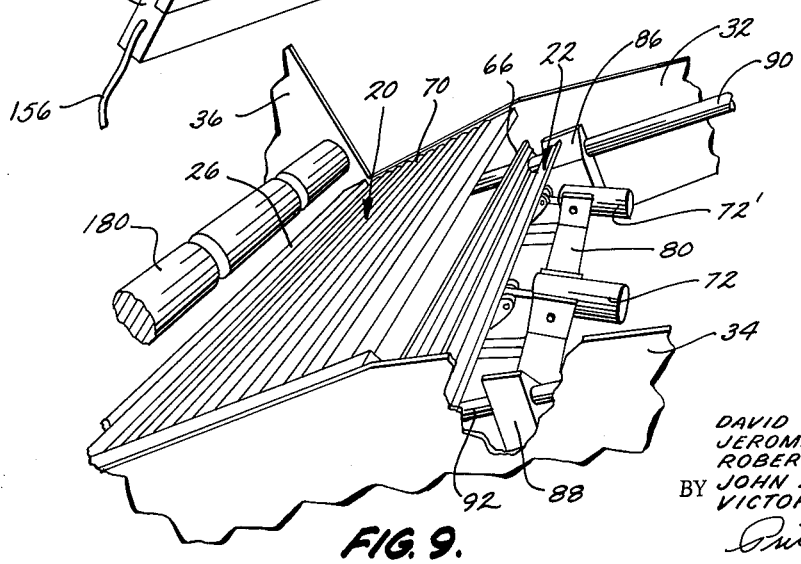

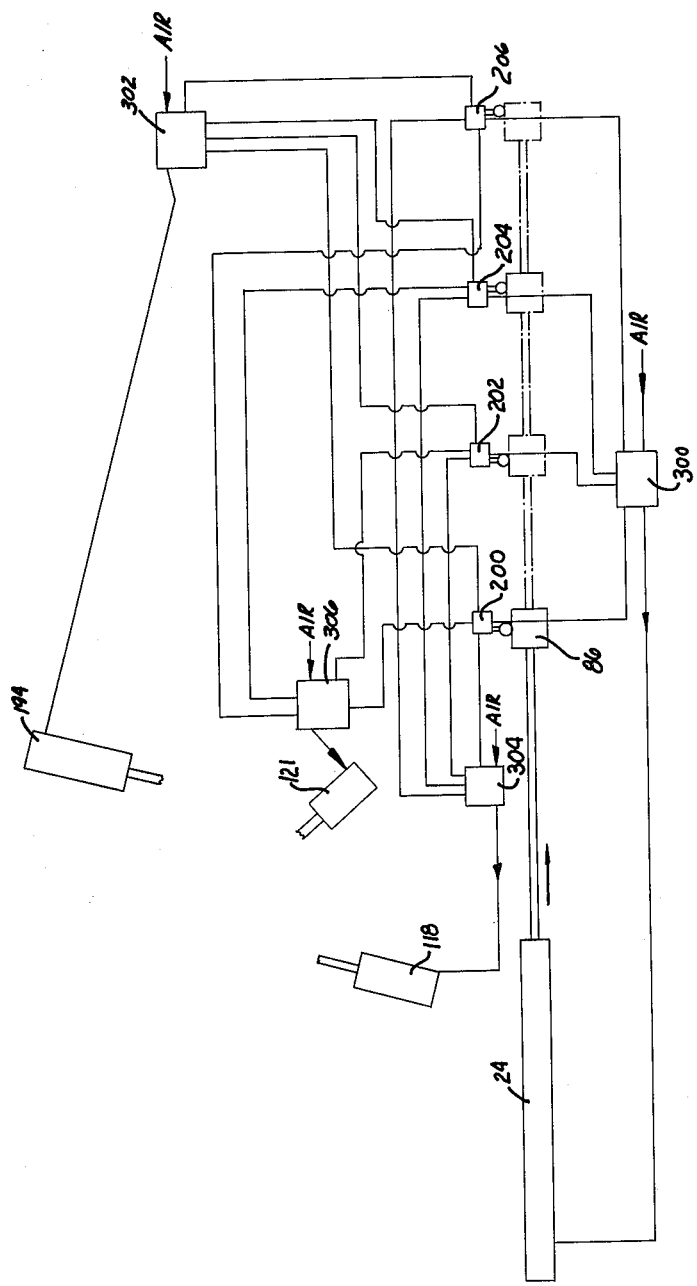

3,249,139
SKINNING MACHINE HAVING AUTOMATIC BLADE PITCH CONTROL
David L. Runnells, Jr., Grand Rapids, Jerome K. Lampe, Grand Haven, Robert J. Broersma, Spring Lake, John A. Harrington, Grand Rapids, and Victor W. Krause, Rockford, Mich., assignors to Wolverine Shoe & Tanning Corporation, Rockford, Mich., a corporation of Michigan
Filed Nov. 13, 1962, Ser. No. 236,862
12 Claims. (Cl. 146—130)

This invention relates to skinning machines, and more particularly to an improved skinning apparatus capable of separating residual meat and fat from the entire saddle portion of hog skins.

Hog skins, when properly treated, provide excellent material for shoes, purses, belts and a variety of other goods. Conventional hog butchering methods include as an initial step the sawing of the hog carcass through the backbone to form two equal halves or "hog sides." After the main meat and bone portions are removed from the hog sides, the residual meat and fat forming bacon and similar valuable products are sliced from the skin during what is commonly termed the "skinning" process. This leaves two relatively small segments of hog side skin useful for the above-mentioned leather goods. Since the hog skin is split when the carcass is split, the two small pieces resulting involve wasted material at the edge portions when a useful piece of leather is cut out from each.

Present hog skinning devices, although very useful, have some limitations in not providing sufficient sensitivity or control of cutting depth of the meat from the skin. The skin is relatively thin adjacent the belly, but gradually changes to a thickness at the rib cage area of about double the belly area thickness. Also, the fat back portion of a chilled hog side is stiffer in its slightly curved or arcuate shape than the belly areas. More pressure is therefore necessary to flatten the fat back for proper cutting as it passes the knife. Consequently, conventional pressure elements applying a generally uniform pressure against the fat back and the belly areas do not effect optimum results. Moreover, the skinning knife edge does not provide optimum skinning on these areas. The pressure and blade depth must be compromised between the belly and fat back areas. Too much pressure applied to the belly area as it is pulled past the knife causes stretching of the skin. Too little pressure on the fat back prevents cutting to the optimum depth. If the knife is pre-set to accommodate the thick skin, meat and fat are left on the thin skin. If the knife is pre-set to accommodate the thin skin, tough skin or "rind" is left on the meat.

Another limitation of present skinning apparatuses is the tendency for a fibrous sheath to form on the cutting blade edge, and thereby limit the accuracy of skinning.

When effecting this skinning action by pulling the skin past the blade edge, gripper means must also be utilized. In prior structures, there is required either skin-penetrating gripping means which damages the skin edge, or air cylinder operated clamping means which grasps a fat wedge as well as the skin. This clinging fat wedge impedes the "fleshing" operation on the skin. Further, and probably more important, after the skinning operation on conventional equipment, the skin is not oriented for the next operation and is at a low position near the floor. It must, therefore, be lifted to an elevated position and reoriented for the next operation.

Another disadvantage of present equipment is the ineffectiveness in skinning "hot" carcasses, i.e. those skinned within about 25–45 minutes after death. These hot carcasses are still pliable and require no pressure rollers for skinning. However, a hot carcass can conceivably cause contamination of the skinning blade to thus affect subsequently skinned carcasses. Further, fibrous tissues tend to collect on the blade edge to lower the quality of the skinning.

It is therefore an object of this invention to provide a skinning apparatus that leaves the skin oriented in an elevated position ready for the next operation. The skin moreover has no fat wedge to be removed.

It is another object of this invention to provide a skinning apparatus that enables "skinning" of complete saddle portions of hog skins in an accurately controlled manner. It provides exact and variable cutting depth of the meat from the skin, both in the thin-skin, softer belly areas on opposite sides of the complete skin and in the thick-skin, harder fat back areas in the center of the skin. This control is achieved even though first one belly portion is skinned, then a fat back portion, and then another belly portion is skinned. This exact depth control is achieved even though the skin is chilled, rather stiff, and somewhat arcuate in configuration, so that the stiffer fat back areas do not flatten out as readily as the softer belly areas. It enables more effective use of the skin since one large piece is achieved, rather than two small pieces.

It is another object of this invention to provide a skinning apparatus wherein every bit of meat, as well as skin, is useful and undamaged, including the edges where gripping occurs.

It is another object of this invention to provide a skinning apparatus capable of continued high skinning speeds and high quality control due to a novel cutting action. The knife edge is generally free from build-up of a fibrous "sheath" to impede skinning.

It is still another object of this invention to provide a skinning apparatus having unique knife blade control effecting a variable pitch cutting effect. Moreover, the pitch can be automatically controlled in response to an independent parameter, preferably skin movement past the knife edge, to provide optimum blade pitch and cutting action both in the soft belly areas and in the harder fat back areas. This is achieved even though the blade pitch must vary first to accommodate the soft areas, then the hard areas, and then the soft areas again. This is achieved on a programmed basis.

It is another object of this invention to provide a skinning apparatus wherein the pressure contacting means holding the skin and meat against the cutting blade is controllably variable in pressure applied. Moreover, the pressure intensity is automatically controlled in response to an independent parameter, preferably skin movement. This is effected simultaneously with the automatic blade pitch control, and on a programmed basis.

Another object of this invention is to provide a skinning apparatus enabling skinning of "hot" carcasses without danger of contamination from one skin to another, and without build-up of a fibrous sheath on the blade edge.

A further object is to provide a unique edge pre-cutter means and method enabling gripper means to grasp only skin. No fat or meat wedge is grasped. The skin is not punctured. All of the fat and meat portions are therefore saved and useable. A novel gripping means is provided to grasp the skin for pulling it past the knife.

It is another object to provide a machine capable of pulling a skin from a conveyor at a convenient height, and after skinning is complete, of placing the skin and separated meat back on the conveyor automatically, thus saving the manual labor ordinarily required to remove the skin and meat and place them on the conveyor.

It is still a further object to provide a skinning machine that places the tissue to be severed in a state of high stress to provide optimum cutting efficiency and substantially reducing drag of the skin on the knife.

These and several other objects of this invention will become apparent upon studying the following specification in conjunction with the drawings in which:

FIG. 1 is a perspective view of the complete skinning apparatus;

FIG. 2 is a perspective view of the edge pre-cutting means;

FIG. 3 is an elevational sectional enlarged view taken on plane III—III of FIG. 1 and showing the skinning process;

FIG. 4 is an elevational view of the variable pressure contacting means and the variable pitch cutting means with one type of control means therefor;

FIG. 5 is a perspective enlarged view of the cutting knife and holder;

FIG. 6 is a fragmentary perspective enlarged view of the front of the cutting means;

FIG. 7 is a fragmentary sectional view showing the cutting operation of soft fatty areas;

FIG. 8 is a fragmentary sectional view showing the cutting operation of meaty areas;

FIG. 9 is a fragmentary perspective view of the upper side of the skin support means and the gripper means shown open and shifted;

FIG. 10 is a fragmentary view of a portion of the pre-cutter; and

FIG. 11 is a partial schematic view of the apparatus, showing the basic interrelationship of the cylinders with the control system.

Basically, the inventive skinning apparatus comprises lobster claw gripping means to grip and shift the combined skin and attached meat and fat past a cutter blade, variable pitch blade means shiftable on a programmed basis to provide controlled pitch changeable in response to movement of the skin, and a variable pressure contacting means holding the skin and meat to the blade and variable on a programmed basis to provide a controlled pressure change in response to movement of the skin. It thereby cooperates with the variable pitch blade to effect controlled depth cutting of the meat in both soft belly areas and in harder fat back areas. The blade pitch and the pressure application variation is preferably effected through fluid cylinders operated by a means controlled in response to skin movement. The skinning occurs by pulling skin and meat around the edge of a skinning bar, while the blade is oscillated laterally to provide a unique, fast cutting action.

A novel pre-cutter slices the side edge of the skin from the meat before it is gripped, to thereby prevent damage to the meat edge by providing a flap of skin to be grasped.

The skinning apparatus includes hot water cleansing means, preferably in the blade itself, to clean the blade after each skin. This enables skinning of "hot" carcass middle portions without contamination. Also, the hot washing spray removes fibrous tissues and lubricates the blade edge.

Referring to the drawings, the novel skinning apparatus 10 is shown as including the novel pre-cutter means 12, a support means 14, the variable pitch cutting blade means 16, the variable pressure contacting means 18, and the skin support means 20. The novel skin gripping means 22 and its fluid cylinder actuators 24 as well as skinning bar 26 are shown more specifically in FIG. 3.

The novel skinning apparatus 10 is mounted upon suitable legs 28. The pre-cutter device is shown mounted upon other suitable legs 30. The skinning device is shown mounted between a pair of side panel members 32 and 34 which include upstanding ears 36 and 38 to support the variable pressure contacting means 18. Basic movement of the whole or complete hog skin and meat is to the left from the pre-cutter support 14 as viewed in FIG. 1, and then downwardly around the skinning bar 26 as illustrated in FIG. 3.

The pre-cutter device 12 preferably comprises a round rotatable cutting blade or disc 40 operated by motor 42, which may be an electrical motor, an air motor, or other similar device. The pre-cutter support 14 includes a series of conveyor rollers mounted between side flanges so that the skin will readily glide over the rollers and past the pre-cutter in the direction of the arrow illustrated in FIG. 1. A guide flange 44 adjacent the pre-cutter 40 limits the depth of the pre-cutting action illustrated specifically in FIG. 2. The pre-cutter is preferably mounted adjacent the skinning apparatus for maximum cooperation therewith. However, in the broadest aspects of this invention, it should be realized that the pre-cutting means may assume several different structural make-ups and may be mounted completely independently of the main skinning apparatus.

For illustrative purposes, a complete hog skin 50 with integral meat and fatty areas 52 is shown in FIG. 2. Although shown to be substantially flat, it should be realized that the combination often is usually somewhat arcuate in configuration. The central fat back portion is usually more rigid than the softer belly areas 56 and 56' where the skin is longitudinally slit. The fat back includes lean areas 54. A phantom line 58 on the skin in FIG. 2 illustrates where conventional butchering techniques normally cut the skin into two like parts. According to the novel method of handling it, the skin is preferably kept whole.

The pre-cutter blade 40 whirls to sever an edge of skin 50 from meat 52 to a depth of up to a couple of inches in width. This severed skin flap is then depressed by plow edge 60 (FIG. 10) of support 14 so that the skin passes through slot 62 (FIG. 1) in side panel 34, to a position between the jaws or lobster claws 64 and 66 of the novel gripper means 22. These claws are preferably corrugated on their inner surfaces to effect a secure gripping action on the skin. Since only the skin is gripped, the complete meat portion is left for valuable edible products. As seen in FIG. 3, gripper means 22 is located beneath support means 20. This support 20 is essentially a tilted platform means which includes bar guide 26 at the lower end and a series of rollers 70 parallel to skinning bar 26 and extending diagonally upwardly and away from skinning bar 26. The bar assumes only a small vertical space as contrasted with the drum mechanism of prior devices. The tilted platform, in combination with this relatively small bar, enables the skin to be in an elevated position after the skinning operation has occurred.

The jaws of the gripper means may be operated by a pair of fluid cylinders 72 and 72' shown more specifically in FIG. 9. These air or hydraulic cylinders 72 are pivotally mounted to a transverse support beam 80, the ends of which are affixed to a pair of block riders 86 and 88 on opposite sides of the apparatus. These riders slide on a pair of longitudinal pilot bars 90 and 92 (FIG. 9) secured between mounting plates 94 and 96 at the base of the apparatus (FIG. 1) and a cross panel 98 at the upper end of the apparatus.

The skinning guide bar 26 is here shown in the form of an elongated element having an oblong cross section. On the other hand it may be a cylindrical bar similar to rollers 70. Mounted adjacent the lower edge of guide bar 26 and at a controlled spaced relationship thereto is the cutter blade means 16. This includes a blade element 100, and a blade holder including parts 102 and 104. The blade 100 preferably has a generally T-shaped configuration including cross element 140 to retain it in the holder. The blade holder is in turn pivotally mounted to support 106 by bracket 107. Support 106 may include arcuate projections interfitting in arcuate slots in a pair of rigid guide blocks 108. The position of the blade holder in this interfitting relationship is controlled by extension or contraction of rod 116 of fluid cylinder 118 (FIG. 4). Rod 116 is pivotally attached between ears 110 secured to support 106 to move the blade in an arcuate path to vary the pitch angle of the blade with respect to skinning bar 26. This variation is to suit the varying characteristics of the tissue fibers across the skin. Also, the depth of cut can be controlled by extension and contraction of a second fluid cylinder 121 affixed to the frame portion 123 and having its rod 125 pivotally attached to blade holder 102 to vary the spacing between the blade edge and the skinning bar 26. This support structure may vary widely as long as the pitch variation and depth variation is achieved. The fluid cylinder 118 is affixed beneath platform 120. The blade 100 is thus mounted for pivotal arcuate movement to change its pitch, i.e. cutting angle with respect to bar 26, and change the depth of cut to enable accommodation of both soft, thin-skin, belly areas and tougher, thick-skin back areas.

The blade 100 is laterally sliable a limited amount within its holder, so that it may be oscillated laterally by a conventional fluid motor 142. This motor is shown mounted to the back of the blade holder, and having a portion 144 extending through slot 146 in holder portion 104 and affixed to blade 100 (FIG. 5). The motor may be mounted in other suitable ways, e.g. at the end of the blade holder.

The blade holder also preferably includes a series of cleaning, hot water spray outlets 150 (FIG. 6) adjacent the blade edge. Pressurized water at a temperature of at least 126° F. may be injected through tube 156 (FIG. 5) into passageway 158 (FIG. 6) extending longitudinally of holder portion 102, through spaced passageways 160, and to outlet ports 150 to periodically spray and clean the blade edge. This enables hot carcass skinning without danger of contamination from one skin to another, since the blade can be sprayed clean after each skin. The water also serves as a lubricant. It further removes fibrous tissue caught on the blade edge, thereby helping to assure neat accurate cutting.

Blade holding portions 102 and 104 are also preferably scalloped as at 162 along their leading edge to reduce frictional contact with the blade during its oscillatory action.

Mounted between upwardly extending panel ears 36 and 38 of the frame is a pressure application means 18. This preferably comprises a plurality of rollers 180, each mounted on a suitable U-shaped bracket 182. Each bracket is mounted to a common transverse support bar 184 by a pair of studs 186 having compression springs 185 between the roller and bar (FIG. 1). Thus the rollers have limited resilinet movement toward support bar 184 when pressure is applied to the combination skin and meat. Support bar 184 is mounted between a pair of rollers 190 which are vertically reciprocable in channel guides 192. Movement of the assembly is achieved through a respective pair of fluid cylinders 194 and 196 affixed to frame portions 36 and 38. Thus by reciprocation of the pistons and piston rods of these air cylinders, the pressure of rollers 180 on the combined skin and adjacent fat and meaty areas against the blade may be closely varied in an accurately controlled manner. By controllably varying the roller pressure, optimum pressure can be applied both to the belly area to flatten it without skin stretching, and to the tougher flat back to completely flatten it. These factors hold true for conventional chilled carcass skinning. When skinning "hot" carcass products, pressure rollers are not normally required since the skin and meat are soft and pliable.

The pitch of knife blade 100 and the pressure applied by contact means 18 is controlled on a programmed basis to provide optimum controlled depth to the cut as the chilled skin pases the cutter blade around guide 26, including the initially cut belly area 56 where soft tissue and thin skin predominate, the central fat back area where tougher tissue and thick skin predominate, and the opposite belly side area 56′.

Referring to FIG. 4, one suitable programming control means is illustrated. The programmed basis is controlled in response to an independent parameter i.e. movement of the skin and gripper means. Before the stroke of air cylinders 24 begin to shift the blocks 86 and 88 (FIG. 9), gripper means 22 and skin 50 upwardly and to the right in the apparatus as illustrated, block 86 is in the position shown in solid lines in FIG. 4. The control means is shown to include a plurality of limit switches 200, 202, 204 and 206 actuated by block 86. These limit switches are electrically connected to solenoid valves 300, 302, 304, 306 through the electric lines shown without arrows in FIG. 10, with the compressed air being supplied to the valves and then to the cylinders as shown by the arrows in FIG. 10. With controlled shifting of the valves from one position to another, the reguated air flow is caused to variably control fluid pressure to (1) fluid cylinders 24 shifting the gripper means and skin, (2) fluid cylinders 194 and 196 operating the pressure rollers, (3) fluid cylinder 118 shifting the pitch of knife 100, and (4) fluid cylinder 121 to vary the depth of cut of knife 100. At the start of the operation, the roller assembly 18 is preferably pivoted on rod 184 to the position shown in phantom in FIG. 4 to allow entry of the skin and meat therebeneath. Then the roller assembly is pivoted down so that the apparatus is in the position shown in solid lines in FIG. 4. At this position, a minimum of pressure is applied by cylinders 194 and 196 to roller assembly 18 so that the applied roller pressure to the product will be about 40 p.s.i. for example. Also cylinder 118 is retracted to the lowermost position to have the smallest angle between the knife, i.e. holder and the lower surface of the combined means and skin on the support 20. Also cylinder 121 is retracted to move the knife to its closest spacing from bar 26 to give the thinnest skin cut. The pressure applied to cylinders 24 will be small to cause slow movement of the gripper and skin.

Actuation of limit switch 202 by block 86 will shift the solenoid valves to increase pressure to cylinders 194 and 196, to speed up movement of cylinders 24, to shift cylinder 118 to increase the blade pitch, and to shift cylinder 121 to take a thicker skin cut. Actuation of limit switch 204 will result in the maximum pressure to cylinders 194 and 196 for maximum roller pressure. It will cause a lesser pressure to cylinders 24 to obtain a slow skin speed. Maximum pressure to cylinder 118 will cause maximum blade pitch. Limit switch 206, when actuated, shifts the valves to decrease the fluid pressure to the cylinders to a moderate value of about the same value as when switch 202 is actuated. Thus as soft belly tissue in portion 56 of the hide (FIG. 2) is drawn past the knife blade, the blade will have a pitch such as that illustrated in FIG. 7 since the fat readily cuts as deep as necessary at this angle. At first the skin movement is slow and then speeds up. As movement of the skin continues into the tougher fat back areas, the angle and pitch of the blade changes so that it can cut to the proper depth even though the skin is thicker and more difficult to flatten by the pressure rollers. The speed of skin movement decreases in this tougher area. Simultaneously, the pressure on the rollers 180 begins in relatively small amounts since the soft belly portion is readily flattened. As air cylinders 24 shift, however, the tougher, fat back area 58 begins passing the knife blade 100. The roller pressure is therefore gradually increased. It is decreased again in the soft opposite belly area 56′.

Obviously, other forms of hydraulic, mechanical or electrical control means to vary the pressure on the rollers, the blade pitch, and the skin speed in response to an independent parameter, and thus accommodate the varying characteristics of the meat and skin can be utilized.

Operation

To obtain a whole saddle portion of the skin, the back bone must be "chisel split" as with a pneumatic chisel to prevent slitting of the adjacent skin. Then the major meat and bone portions are cut out. To remove the remaining meat and fat from the whole hog skin saddle portion such as that illustrated in FIG. 2, the skin is placed lengthwise on the pre-cutting support 14 and conveyed adjacent guide 44 into revolving cutter disc 40. This precuts a slit a couple inches wide between the belly meat and adjacent skin 50 to form a flap. Plow 60 bends the flap downwardly to a position between the corrugated lobster claws 64 and 66 of the novel gripper mechanism 2. The skin now rests upon the top of tilted support 20. Next, the pair of air cylinders 72 and 72' are actuated to close jaw 64 against jaw 66 on the elongated narrow flap of skin. The gripper 22 is then ready to be shifted to the right and diagonally upwardly along with the pilot locks 86 or their equivalent on guides 90 and 92. Roller assembly 18 is then pivoted downwardly as in FIG. 4.

With actuation of limit switch 200, pressure applied to rollers 180 by fluid cylinders 194 and 196 is at a minimum, blade 100 is at its smallest angle with respect to the bottom of the skin and meat as illustrated in FIG. 7 since the soft belly areas 56 are the first to be cut, the blade is close to bar 26 since the belly skin is thin, and the actuating pressure for cylinders 24 is very small to start the skin at a slow speed. Fluid cylinders 24 are actuated to shift the mechanism upwardly and to the right as illustrated to pull the skin gradually around the front edge of guide bar 26 and diagonally upward under the support platform 20. At the start, typical values are 0–3 p.s.i. roller pressure and 300 inches per minute skin speed.

During cutting, air motor 142 oscillates blade 100 within its holder to provide a lateral cutting action. The gripper means and skin are drawn in one general direction up guides 90 and 92 in a generally rectilinear fashion. Although the chilled skin and meat are somewhat arcuate in configuration, the pressure and blade angle minimize this by pressing the skin and meat properly into the blade. As the skin continues to move and limit switch 202 is actuated, the skin speed is accelerated through the soft belly tissue, e.g. to a velocity of about 1500 inches per minute. Further movement of the skin moves the tough fat back portion into the blade. Limit switch 204 is here actuated. This slows the skin speed to a medium speed of about 1000 inches per minute for example by lessening the actuating fluid pressure to cylinders 24. Also the roller pressure is increased to a maximum of about 30 p.s.i., for example to flatten the tough fat back, the blade pitch is increased to accommodate the thicker skin in the rib cage area, and the blade edge is shifted away from bar 26 to accommodate the thick skin. After the fat back has passed the blade, and the opposite belly portion 56' is beginning to pass the blade, limit switch 206 is actuated to increase the skin speed again to about 1500 inches per minute, decrease the roller pressure to a minimum, and lessen the blade pitch and cut depth to accommodate the thin soft skin. Instead of the few exemplary limit switches shown, a large number may be mounted side by side to provide a more gradual change of conditions of these three elements.

By so doing, completely programmed, controlled skinning is achieved, in spite of the fact that thick, tough, fibrous, fat back areas are encountered in the center, soft thin belly tissues are encountered on both sides of the skin, and all variations are in between. All are exactly cut at to an optimum controlled depth.

When the mechanism has moved to the position illustrated in phantom on the far side shown in FIG. 4, the gripping jaws open as illustrated in FIG. 9 to automatically drop the elevated hog skin directly onto another conveyor means 91 for the next operation without requiring manual handling. The meat, in the meanwhile, has automatically been carried off on conveyor means 93 (FIG. 4) to be used for valuable bacon and related products.

Not only can the novel device accommodate whole hog skins with a controlled cutting depth to provide a larger skin which can be used in a more efficient manner, but it also does not waste meat along the edge of the skin where the gripping occurs. After the skin is dropped, hot water is sprayed from outlets 150 onto the blade edge to cleanse it from any infectious substance possibly encountered, and to remove fibrous tissues on the blade edge. This cleansing enables skinning of hot carcass skins, especially when used in combination with the vibrating knife. In this case, pressure rollers are not normally required since the skin is soft and pliable. In brief, therefore, the inventive apparatus provides more leather, more meat, faster production, less blade wear, less labor, and more economical operation. Other advantages will be apparent to those skilled in the art upon studying the foregoing form of the invention as illustrated. Further, various obvious modifications in the several features of the inventive apparatus may occur to those in the art to suit a particular situation, once the principles explained above are understood. These obvious modifications are deemed to be part of this invention, which is to be limited only by the scope of the appended claims and the reasonably equivalent structures to those defined therein.

We claim:

1. A skinning apparatus for slicing meat from an animal skin comprising: means to secure and pull the combined skin and meat; a cutting blade mounted to slice said meat from said skin during the pulling action; means mounting said blade to allow arcuate blade movement to vary its pitch and to allow blade movement toward its edge to vary depth of cutting and shiftable control means operably associated with said blade and responsive to movement of said skin to vary the pitch of said blade in accordance with toughness characteristics of said skin and meat, and to vary the cutting depth of said blade in accordance with skin thickness.

2. A skinning apparatus adapted to slice the meat and fat from the whole saddle portion of a hog skin comprising: skin support means; means to pull the combined skin and meat; cutting blade means to sever said skin from said meat as it is pulled along said support means; means mounting said blade means to allow blade movement to vary its cutting action; blade shifting control means operably associated with said blade means and positioned adjacent said support means and responsive with movement of a skin along said support means to shift said blade means on a programmed basis over the width of said skin to effect controlled depth cutting in soft thin-skin belly areas and in harder thick-skin fat back areas.

3. A skinning apparatus adapted to slice the meat from the whole saddle portion of a hog skin comprising: skin support means; means to pull the combined skin and meat; cutting blade means to cut said meat from said skin as it is pulled along said support means; pressure roller means for forcing said skin and meat into contact with said knife; means mounting said pressure roller means, control means operably associated with said mounting means to vary the pressure applied thereby on a programmed basis over the width of said skin, said control means being responsive with skin movement along said support means to provide cutting control over fatty and meaty areas.

4. A skinning apparatus adapted to slice the chilled meat from the whole saddle portion of a hog skin comprising: skin support means; means to pull the combined skin and meat; cutting blade means to sever said meat from said skin as it is pulled; means mounting said blade means and allowing it to shift and vary the pitch thereof on a programmed basis over the width of said skin to effect controlled depth cutting in soft areas with thin skin and harder areas with thick skin; pressure roller means for forcing said skin and meat into contact with said knife; means mounting said pressure roller means to enable it to vary the pressure applied thereby on a programmed basis over the width of said skin to flatten said skin and provide accurate cutting control over all areas; blade shifting means; pressure roller shifting means; and control means operably associated with said blade shifting means and said pressure roller shifting means and responsive with movement of a skin along said skin support means to achieve the programmed actions.

5. A skinning apparatus comprising: a tilted skin support means; a bar surface across the lower end of said support means; a knife blade mounted adjacent said bar surface; and gripping and pulling means mounted beneath said support means at an acute angle from said skin support means, to draw a skin through an obtuse angle from said support means, and said gripping and pulling means being shiftable from a position adjacent said bar surface, diagonally upwardly along the underside of said tilted support to an elevated position, whereby an animal skin having meat thereon can be pulled from a position on said support, past said blade to separate the meat and skin, around said bar surface, and diagonally upwardly to an elevated position for the next operation; conveyor means to receive said skin; and conveyor means to receive said meat.

6. A skinning apparatus comprising: gripping means to grip an animal skin having meat thereon; means to shift said gripping means to pull said skin; a bar guide mounted to support said skin and allow it to be pulled around a portion of its periphery; a knife blade adjacent to and spaced from said bar guide to peel the meat from said skin as it is pulled around the bar; said blade being mounted to have a variable pitch with respect to said bar guide; pressure contacting roller means adjacent said blade and said bar guide; said contacting means being of variable pressure intensity; fluid cylinder means adapted to move said blade arcuately and vary the pitch thereof; fluid cylinder means adapted to shift said pressure contacting means; and both said fluid cylinder means being responsive to movement of said skin.

7. A skinning apparatus comprising: gripping means to grip an animal skin having meat thereon; means to shift said gripping means to pull said skin; a bar guide mounted to support said skin and allow it to be pulled around a portion of its periphery; a knife blade adjacent to and spaced from said bar guide to peel the meat from said skin as it is pulled around the bar; said blade being mounted to have a variable pitch and spacing with respect to said bar guide; pressure contacting means adjacent said blade and said bar guide; said contacting means being of variable intensity; fluid cylinder means adapted to move said blade and vary the pitch thereof and to vary the spacing thereof; fluid cylinder means adapted to shift said pressure contacting means; valve control means for said cylinder means; valve control means to cause said pressure contacting means to apply less pressure at the beginning, to increase in pressure at the center area of said skin, and to decrease in pressure at the end; and said valve control means adapted to cause said blade to vary in pitch and in spacing for cutting depth from the beginning to the center area of said skin, and to change back again at the end.

8. In a skinning apparatus comprising: gripping means to grip an animal skin having meat thereon; means to shift said gripping means to pull said skin; cutter means adjacent said skin to sever said meat from said skin when said skin is pulled; means for allowing endwise movement of the combined skin and meat to a position adjacent said gripping means; and an edge slicing knife mounted adjacent said means to sever the edge of said meat from the edge of said skin to allow a gripper to grasp only said skin.

9. In a skinning apparatus comprising: gripping means to grip an animal skin having meat thereon; means to shift said gripping means to pull said skin; cutter means adjacent said skin to sever said meat from said skin when said skin is pulled; means for guiding endwise movement of the combined skin and meat to a position adjacent said gripping means; an edge slicing knife mounted adjacent said means to sever the edge of said meat from the edge of said skin and allow a gripper to grasp only said skin; and a plow edge between said edge slicing knife and said gripping means cooperable with the skin edge to bend it away from the severed meat and into said gripper means.

10. A skinning apparatus comprising: a cutting blade and guide means; variable speed pulling means to pull an animal skin and attached meat and fat past said blade; and control means operably associated with said pulling means and responsive to skin movement, thereby controlling the speed of said pulling means to suit the skin and meat characteristics.

11. A skinning apparatus comprising: a cutting blade and guide means; variable speed pulling means to pull an animal skin and attached meat and fat past said blade; said blade being variable; and control means operably associated with said pulling means and responsive to skin movement thereby controlling the speed of said pulling means and the variation of said blade to suit the skin and meat characteristics.

12. A skinning apparatus comprising: a cutting blade and guide means; variable speed pulling means to pull an animal skin and attached meat and fat past said blade; said blade being shiftable to have a variable pitch and cutting depth; shiftable pressure contacting means to flatten the skin against said blade with variable pressure; and control means responsive to skin movement, and operably associated with said pulling means, blade, and pressure contacting means for controlling the speed of said pulling means, the pitch and depth of said blade, and the pressure of said contacting means to suit the skin and meat characteristics.

References Cited by the Examiner

UNITED STATES PATENTS

| | | | |
|---|---|---|---|
| 657,322 | 9/1900 | Taliaferro | 146—130 |
| 1,172,058 | 2/1916 | Scheyer | 83—565 X |
| 1,719,030 | 7/1929 | Smith | 17—45 |
| 1,790,592 | 1/1931 | Morrison | 146—130 |
| 1,803,341 | 5/1931 | Merrick | 146—130 |
| 1,837,514 | 12/1931 | Agar | 17—45 |
| 2,590,747 | 3/1952 | Birdseye | 146—130 |
| 2,649,881 | 8/1953 | Runnells et al. | 146—130 |
| 2,803,279 | 8/1957 | Strand | 146—73 |
| 2,912,027 | 11/1959 | Townsend | 146—130 |
| 3,010,352 | 11/1961 | Dunlap | 83—565 X |

LESTER M. SWINGLE, *Primary Examiner.*

LUCIE H. LAUDENSLAGER, J. SPENCER OVERHOLSER, ROBERT C. RIORDON, *Examiners.*